US 11,455,819 B2

(12) United States Patent
Li

(10) Patent No.: US 11,455,819 B2
(45) Date of Patent: Sep. 27, 2022

(54) METHOD AND DEVICE FOR FINGERPRINT ACQUISITION, AND TOUCHPAD

(71) Applicant: BEIJING XIAOMI MOBILE SOFTWARE CO., LTD., Beijing (CN)

(72) Inventor: Yanlong Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 31 days.

(21) Appl. No.: 16/890,250

(22) Filed: Jun. 2, 2020

(65) Prior Publication Data
US 2021/0165986 A1    Jun. 3, 2021

(30) Foreign Application Priority Data
Dec. 2, 2019   (CN) .......................... 201911214172.8

(51) Int. Cl.
*G06V 40/13*      (2022.01)
*G06V 10/147*    (2022.01)

(52) U.S. Cl.
CPC ........ *G06V 40/1306* (2022.01); *G06V 10/147* (2022.01)

(58) Field of Classification Search
CPC .............. G06V 40/1306; G06V 10/147; G06F 3/0446; G06F 3/041661; G06F 3/03547; G06F 3/0416
See application file for complete search history.

(56) References Cited

U.S. PATENT DOCUMENTS

| | | |
|---|---|---|
| 2014/0333328 A1 | 11/2014 | Nelson |
| 2014/0354556 A1 | 12/2014 | Alameh et al. |
| 2014/0359756 A1 | 12/2014 | Alameh et al. |
| 2015/0177884 A1 | 6/2015 | Han |
| 2017/0315640 A1 | 11/2017 | Nelson et al. |
| 2017/0336894 A1 | 11/2017 | Nelson et al. |
| 2017/0336906 A1 | 11/2017 | Yoon et al. |
| 2017/0364178 A1 | 12/2017 | Nelson et al. |
| 2018/0113346 A1 | 4/2018 | Han et al. |

FOREIGN PATENT DOCUMENTS

| | | |
|---|---|---|
| CN | 105335728 A | 2/2016 |
| EP | 3246801 A1 | 11/2017 |

OTHER PUBLICATIONS

Supplementary European Search Report in the European application No. 20183403.3, dated Dec. 7, 2020.

*Primary Examiner* — Abhishek Sarma
(74) *Attorney, Agent, or Firm* — Syncoda LLC; Feng Ma

(57) ABSTRACT

A method for fingerprint acquisition includes: monitoring a fingerprint acquisition triggering event continuously; and starting fingerprint scanning in a partial or whole of a region of a touchpad in response to the fingerprint acquisition triggering event.

18 Claims, 11 Drawing Sheets

METHOD AND DEVICE FOR FINGERPRINT ACQUISITION, AND TOUCHPAD

CROSS-REFERENCE TO RELATED APPLICATION

This application claims priority to Chinese patent application No. 201911214172.8 filed on Dec. 2, 2019, the disclosure of which is hereby incorporated by reference in its entirety.

BACKGROUND

Fingerprint has almost become synonymous with biometric feature recognition by virtue of its immutability, uniqueness and convenience. A fingerprint refers to lines formed on the front uneven skin of a fingertip of a person, and the lines are regularly arranged to form different patterns. Based on the uniqueness of a fingerprint, each electronic device may adopt this feature to identify a user.

SUMMARY

The present disclosure generally relates to the field of electronic devices, and more specifically to a method and a device for fingerprint acquisition.

According to a first aspect of embodiments of the present disclosure, a touchpad is provided, which may include a control circuit, the touchpad further including a first electrode group and a second electrode group, wherein the first electrode group includes multiple first sensor electrodes arranged in parallel in a first direction, each of the first sensor electrodes is spaced from an adjacent first sensor electrode with a first gap, and each of the first sensor electrodes is electrically connected with the control circuit through at least one of first signal lines;

the second electrode group includes multiple second sensor electrodes arranged in parallel in a second direction, each of the second sensor electrodes is spaced from an adjacent second sensor electrode with a second gap, and the first direction is not parallel to the second direction;

the first gap is less than or equal to 50 μm, and the second gap is less than or equal to 50 μm; and the control circuit is configured to apply a touch scanning signal to a first number of the first sensor electrodes in the first electrode group through the at least one of the first signal lines and apply a fingerprint acquisition signal to a second number of the first sensor electrodes in the first electrode group through the at least one of the first signal lines, wherein the second number is larger than the first number.

According to a second aspect of the embodiments of the present disclosure, a touchpad is provided, which may include a control circuit, the touchpad further including a first electrode group and a second electrode group, wherein the first electrode group may include a first basic electrode group and a first collecting electrode group, and the second electrode group may include a second basic electrode group and a second collecting electrode group;

the first electrode group includes a first basic electrode group and a first collecting electrode group, and the second electrode group includes a second basic electrode group and a second collecting electrode group;

the first basic electrode group includes multiple first basic sensor electrodes arranged in parallel in a first direction, each of the first basic sensor electrodes is spaced from an adjacent first basic sensor electrode with a first basic gap, and each of the first basic sensor electrodes is electrically connected with the control circuit through at least one of first signal lines;

the second basic electrode group includes multiple second basic sensor electrodes arranged in parallel in a second direction, each of the second basic sensor electrodes is spaced from an adjacent second basic sensor electrode with a second basic gap, and the first direction is not parallel to the second direction;

the first collecting electrode group includes multiple first collecting sensor electrodes arranged in parallel in the first direction, each of the first collecting sensor electrodes is spaced from an adjacent first collecting sensor electrode with a first acquisition gap, and each of the first collecting sensor electrodes is electrically connected with the control circuit through the at least one of the first signal lines;

the second collecting electrode group includes multiple second collecting sensor electrodes arranged in parallel in the second direction, and each of the second collecting sensor electrodes is spaced from an adjacent second collecting sensor electrode with a second acquisition gap;

the first basic gap is larger than the first acquisition gap, and the second basic gap is larger than the second acquisition gap;

the first acquisition gap is less than or equal to 50 μm, and the second acquisition gap is less than or equal to 50 μm;

in case that the first electrode group and the second electrode group are stacked, an overlapping portion of the first collecting electrode group and the second collecting electrode group forms an acquisition region, and a region of the touchpad except the acquisition region is a basic region; and the control circuit is configured to apply a touch scanning signal to part or all of the first basic sensor electrodes in the first basic electrode group through the at least one of the first signal lines and apply a fingerprint acquisition signal or the touch scanning signal to part or all of the first collecting sensor electrodes in the first collecting electrode group through the at least one of the first signal lines.

According to a third aspect of the embodiments of the present disclosure, a method for fingerprint acquisition is provided, which may include that:

monitoring a fingerprint acquisition triggering event continuously; and starting fingerprint scanning in a partial or whole of a region of a touchpad in response to the fingerprint acquisition triggering event.

According to a fourth aspect of the embodiments of the present disclosure, a device for fingerprint acquisition is provided, which may include:

a processor; and a memory configured to store instructions executable by the processor, wherein the processor is configured to:

monitor a fingerprint acquisition triggering event continuously; and start fingerprint scanning in a partial or whole of a region of a touchpad in response to the fingerprint acquisition triggering event.

It is to be understood that the above general descriptions and detailed descriptions below are merely exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1:
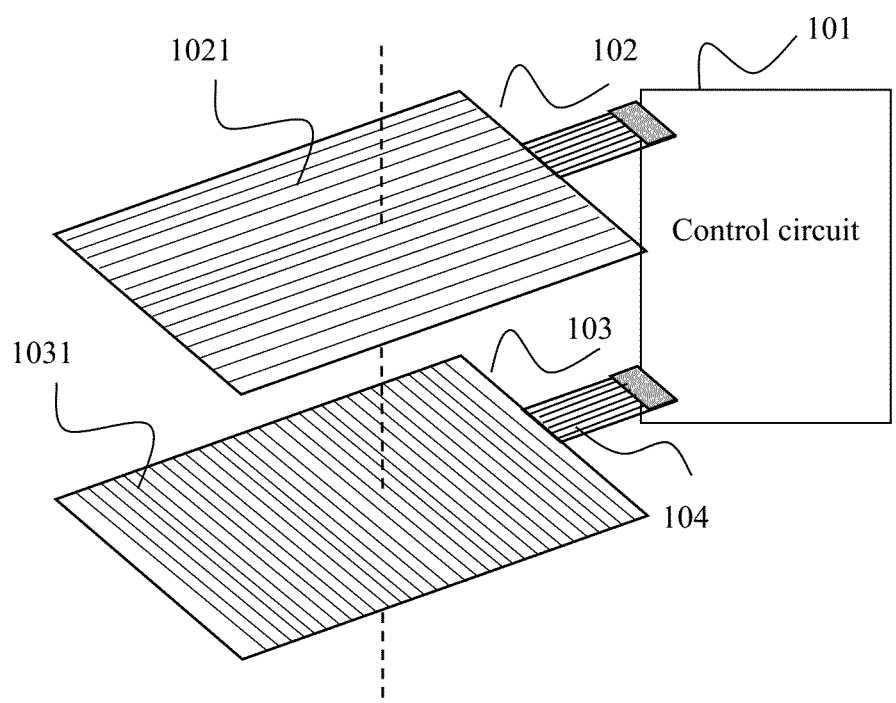
FIG. 1 is a structure diagram of a touchpad, according to some embodiments of the disclosure.

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

An electronic device is usually provided with a touchpad, configured to receive a control operation of a user over a cursor. Touchpad is a key part for interaction between various electronic devices and users. Users send various control instructions to various electronic devices through touchpads.

An implementation manner for a touchpad and a fingerprint module in an electronic device system usually adopts independent design. There are two common implementation manners.

(1) The touchpad and the fingerprint module are independently implemented respectively and are not integrated into the same module. The fingerprint module may be arranged at an upper portion or lower portion of a laptop keyboard, in a blank region on a surface C or on a power button, etc. of the keyboard, and the touchpad is arranged at a middle position at the lower portion of the keyboard. In such an implementation manner, the fingerprint module and the touchpad may realize functions independently and work respectively without interfering with each other, and calling the fingerprint module for data acquisition is judged according to a state of the system. The fingerprint module is relatively high in cost and a detection region is relatively small.

(2) The touchpad and the fingerprint module are integrated, but detection of a sensor and design of a control unit are still independent. For example, a rectangular recessed region is formed in a surface of the sensor of the touchpad, and the fingerprint module is mechanically embedded into the rectangular region. In fact, the touchpad and the fingerprint module are still independently designed. This implementation manner has two problems: one problem is that the rectangular recessed region does not have a navigation control function of the touchpad anymore, a line may be broken when a finger slides here, and an operation habit of a user is not met; and the other problem is that the fingerprint module is high in cost and the detection region is relatively small.

From the above, the manner of independently implementing the fingerprint module and the touchpad respectively is high in cost and difficulties are brought to use.

Various embodiments of the present disclosure provide a method and a device for fingerprint acquisition, and a touchpad. As a touchpad mostly determines a position of a finger on a surface of the touchpad by capacitive detection, and a fingerprint sensor may also be implemented in a capacitive detection manner, in the present disclosure, the touchpad and a fingerprint acquisition module are integrated into a whole part, no special fingerprint module is used, and a mounting position is not required to be independently designed for the fingerprint module. Therefore, the application cost is reduced, a using manner is simpler, and a product is more attractive in appearance.

Some embodiments of the present disclosure provide a touchpad, which, as shown in FIG. 1, structurally includes:
a control circuit 101.

The touchpad further includes a first electrode group 102 and a second electrode group 103.

The first electrode group 102 includes multiple first sensor electrodes 1021 arranged in parallel in a first direction, each of the first sensor electrodes 1021 is spaced from an adjacent first sensor electrode 1021 with a first gap, and each of the first sensor electrodes 1021 is electrically connected with the control circuit 101 through at least one of first signal lines 104.

The second electrode group 103 includes multiple second sensor electrodes 1031 arranged in parallel in a second direction, each of the second sensor electrodes 1031 is spaced from an adjacent second sensor electrode 1031 with a second gap, and the first direction is not parallel to the second direction.

Because fingerprint information acquisition has a relatively high accuracy requirement, scanned data requires that pixels are more than or equal to 500 PPI, namely a gap between the electrodes is required to be less than or equal to 50 μm, and when touch coordinate information is acquired, a typical value of the gap between the scanning electrodes is usually distributed about 3.5 mm. Therefore, setting the first gap and the second gap in a range of 10 μm to 600 μm may simultaneously meet usage requirements in the two application scenarios. Preferably, both the first gap and the second gap range from 10 µm to 50 µm, namely the first gap is less than or equal to 50 µm, and the second gap is less than or equal to 50 µm.

The control circuit 101 applies a touch scanning signal to a first number of the first sensor electrodes 1021 in the first electrode group 102 through the first signal lines 104 and apply a fingerprint acquisition signal to a second number of the first sensor electrodes 1021 in the first electrode group 102 through the first signal lines 104, the second number being larger than the first number. Because touch coordinate acquisition and fingerprint acquisition have different accuracy requirements, the numbers of the first sensor electrodes 1021 required to be driven for acquisition are also different, a relatively large number of the first sensor electrodes 1021 are driven when the accuracy requirement is high, and a relatively small number of the first sensor electrodes 1021 are driven when the accuracy requirement is low. The touch scanning signal triggers part of the first signal lines 104 for interlaced scanning on the touchpad, namely scanning is performed at an interval of multiple electrodes. The fingerprint acquisition signal triggers part or all of the first signal lines for high-accuracy scanning.

Preferably, the first gap is equal to the second gap.

Preferably, the first direction is perpendicular to the second direction.

Preferably, the first electrode group 102 is integrated on a first circuit board, the second electrode group 103 is integrated on a second circuit board, and the first circuit board and the second circuit board are stacked in a complete overlapping manner. The first circuit board and the second circuit board may be flexible printed circuits (FPCs).

Preferably, the first electrode group 102 and the second electrode group 103 may also be integrated on the same circuit board, and the circuit board may be an FPC.

Figure 2:
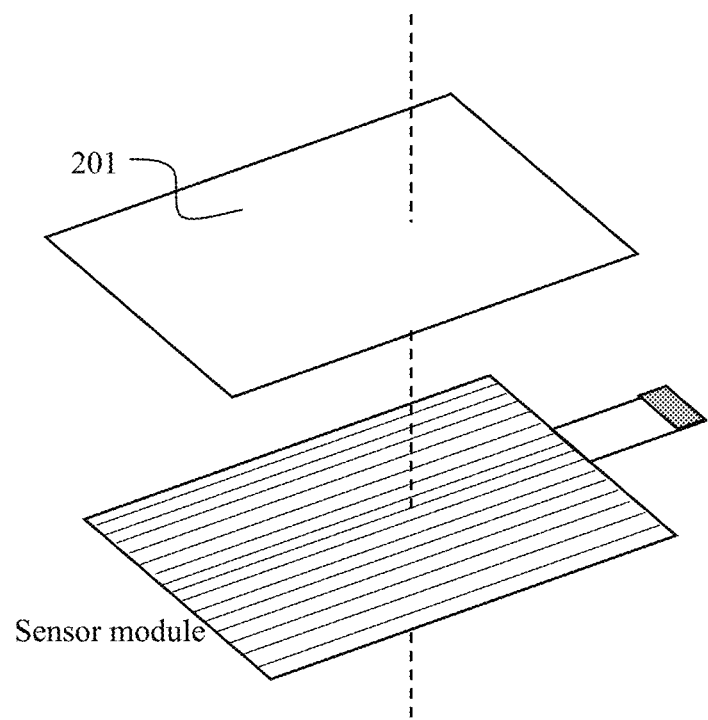
FIG. 2 is a schematic diagram illustrating relative positions of a cover plate 201 and a sensor module, according to some embodiments of the disclosure.

Preferably, the first electrode group 102 and the second electrode group 103 form a sensor module, as shown in FIG. 2, and may also be covered with a cover plate 201. The cover plate 201 protects the sensor module, and a user directly contacts with the cover plate 201 arranged on a front surface of an outer side of an electronic device during use, so that wear to a sensor module circuit is avoided, and meanwhile, attractive appearance is achieved.

Preferably, the first sensor electrode 1021 is a receiver (Rx) electrode, the second sensor electrode 1031 is a transmitter (Tx) electrode, and the first signal line 104 is a driving signal line. The Rx electrode and the Tx electrode may be led out from two FPCs and may also be integrated to the same FPC.

Electrode materials for the first sensor electrode 1021 and the second sensor electrode 1031 may be conducting materials such as copper, indium tin oxide (ITO), MoAlMo, silver, graphene and graphite. The electrode material may be grown on a substrate by use of a yellow light process, or may be bounded by two layers of sensor modules in a cover glass film film (GFF) manner or printed on the substrate. The substrate may be a material such as glass or a film.

Figure 3:
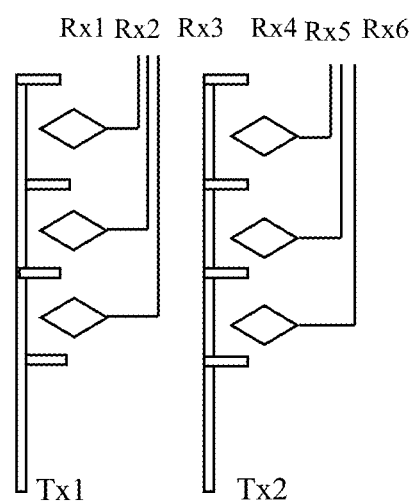
FIG. 3 is a schematic diagram illustrating an electrode shape, according to some embodiments of the disclosure.

Shapes of the first sensor electrode and the second sensor electrode are not limited. FIG. 3 is a schematic diagram illustrating an electrode shape. Rx1-6 are first sensor electrodes, and Tx1 and Tx2 are second sensor electrodes.

Data generated by touch of the finger on the touchpad may be detected in a capacitive detection working manner through the sensor module formed by the first electrode group 102 and the second electrode group 103. A touch control chip in the control circuit 101 reads the data, calculates coordinate data of the finger and sends the coordinate data to a system. Meanwhile, fingerprint information of the fingerprint may also be read and sent to the system.

Figure 4:
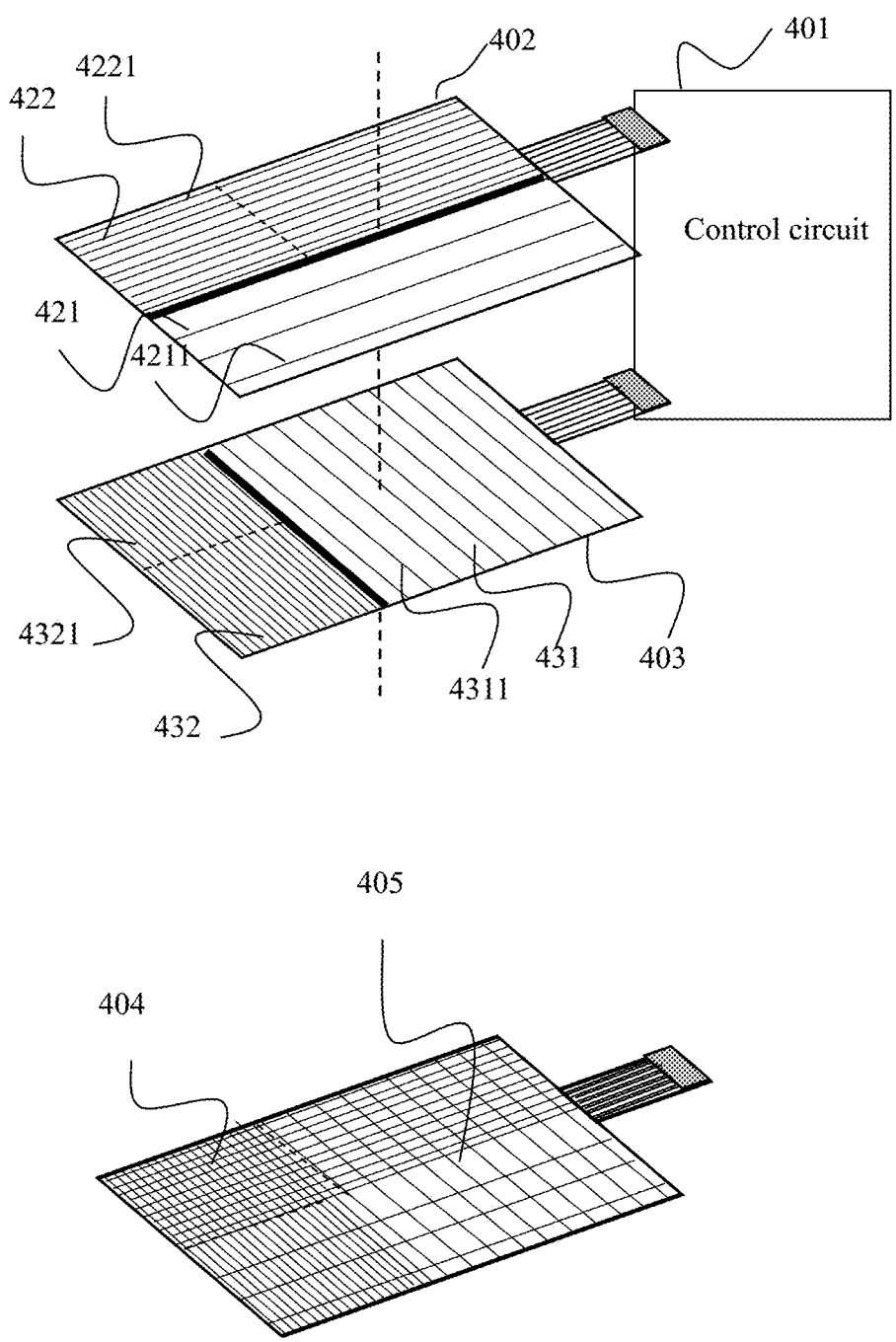
FIG. 4 is a structure diagram of a touchpad, according to some embodiments of the disclosure.

Some embodiments of the present disclosure also provide a touchpad, which, as shown in FIG. 4, structurally includes:
a control circuit 401.

The touchpad further includes a first electrode group 402 and a second electrode group 403.

The first electrode group 402 includes a first basic electrode group 421 and a first collecting electrode group 422, and the second electrode group 403 includes a second basic electrode group 431 and a second collecting electrode group 432.

The first basic electrode group 421 includes multiple first basic sensor electrodes 4211 arranged in parallel in a first direction, each of the first basic sensor electrodes 4211 is spaced from an adjacent first basic sensor electrode 4211 with a first basic gap, and each of the first basic sensor electrodes 4211 is electrically connected with the control circuit 401 through at least one of the first signal lines.

The second basic electrode group 431 includes multiple second basic sensor electrodes 4311 arranged in parallel in a second direction, each of the second basic sensor electrodes 4311 is spaced from an adjacent second basic sensor electrode 4311 with a second basic gap, and the first direction is not parallel to the second direction.

The first collecting electrode group 422 includes multiple first collecting sensor electrodes 4221 arranged in parallel in the first direction, each of the first collecting sensor electrodes 4221 is spaced from an adjacent first collecting sensor electrode 4221 with a first acquisition gap, and each of the first collecting sensor electrodes 4221 is electrically connected with the control circuit 401 through at least one of the first signal lines.

The second collecting electrode group 432 includes multiple second collecting sensor electrodes 4321 arranged in parallel in the second direction, and each of the second collecting sensor electrodes 4321 is spaced from an adjacent second collecting sensor electrode 4321 with a second acquisition gap.

The first basic gap is larger than the first acquisition gap, and the second basic gap is larger than the second acquisition gap.

The first acquisition gap is less than or equal to 50 µm, and the second acquisition gap is less than or equal to 50 µm.

Under the condition that the first electrode group 402 and the second electrode group 403 are stacked, an overlapping portion of the first collecting electrode group 422 and the second collecting electrode group 432 forms an acquisition region 404, and a region, except the acquisition region 404, of the touchpad is a basic region 405.

The control circuit 401 applies a touch scanning signal to part or all of the first sensor electrodes in the first basic electrode group 421 through the first signal lines and applies a fingerprint acquisition signal or the touch scanning signal to part or all of the first sensor electrodes in the first collecting electrode group 422 through the first signal lines.

Furthermore, the first electrode group 402 is integrated on a first circuit board, the second electrode group 403 is integrated on a second circuit board, and the first circuit board and the second circuit board are stacked in a complete overlapping manner. The first circuit board and the second circuit board can be FPCs.

An area of the acquisition region 404 is smaller than an area of the basic region 405.

Furthermore, the first basic gap is equal to the second basic gap, and the first acquisition gap is equal to the second acquisition gap.

Preferably, the first direction is perpendicular to the second direction.

During touch scanning, the control circuit 401 applies the touch scanning signal to part or all of the sensor electrodes of the first basic electrode group 421, the first collecting electrode group 422, the second basic electrode group 431 and the second collecting electrode group 432 through the first signal lines.

During fingerprint acquisition, the fingerprint acquisition signal is applied to part or all of the first collecting sensor electrodes 4221 and second collecting sensor electrodes 4321 in the first collecting electrode group 422 and the second collecting electrode group 432 through the first signal lines.

Because touch coordinate acquisition and fingerprint acquisition have different accuracy requirements, the numbers of the sensor electrodes required to be driven for acquisition are also different, a relatively large number of sensor electrodes are driven when the accuracy requirement is high, and a relatively small number of sensor electrodes are driven when the accuracy requirement is low.

The touch scanning signal triggers part or all of the first basic sensor electrodes 4211 and the second basic sensor electrodes 4311 in the first basic electrode group 421 and the second basic electrode group 431 for interlaced scanning in the basic region 405, namely scanning is performed at an interval of multiple electrodes. Preferably, scanning may also be performed row by row under the condition that a density of the electrodes arranged in the basic region 405 is low and only meets touch coordinate information acquisition.

The touch scanning signal is further configured to trigger part of the first collecting sensor electrodes 4221 and the second collecting sensor electrodes 4321 in the first collecting electrode group 422 and the second collecting electrode group 432 for interlaced scanning in the acquisition region 403, namely scanning is performed at an interval of multiple electrodes, to acquire touch coordinate information.

The fingerprint acquisition signal triggers all of the first collecting sensor electrodes 4221 and the second collecting sensor electrodes 4321 in the first collecting electrode group 422 and the second collecting electrode group 431 for row-by-row scanning in the acquisition region 404 to acquire fingerprint information.

The basic region 405 and the acquisition region 404 form a front region of the touchpad as a whole. The acquisition region 404 may be arranged at any position, and the basic region 405 surrounds the acquisition region 404. Preferably, the acquisition region 404 can be in any size larger than or equal to a 3.0 mm*3.0 mm square region and is not larger than an area of a front surface of the touchpad.

Preferably, the first electrode group 402 and the second electrode group 403 may also be integrated on the same circuit board, and the circuit board may be an FPC.

Preferably, the first basic electrode group 421, the second basic electrode group 431, the first collecting electrode group 422 and the second collecting electrode group 432 form a sensor module, as shown in FIG. 2, and may also be covered with a cover plate 201. The cover plate 201 protects the sensor module, and a user directly contacts with the cover plate 201 arranged on a front surface of an outer side of an electronic device during use, so that wear to a sensor module circuit is avoided, and meanwhile, attractive appearance is achieved. An indicative text or pattern may be added to the cover plate 201 to indicate the acquisition region 404 to help the user in correct operation.

Preferably, the first basic sensor electrodes 4211 in the first basic electrode group 421 and the first collecting sensor electrodes 4221 in the first collecting electrode group 422 are Rx electrodes, the second basic sensor electrodes 4311 in the second basic electrode group 431 and the second collecting sensor electrodes 4321 in the second collecting electrode group 432 are Tx electrodes, and the first signal line is a driving signal line. The Rx electrode and the Tx electrode may be led out from two FPCs and may also be integrated to the same FPC.

Electrode materials for the basic sensor electrodes 4211 and 4311 and the collecting sensor electrodes 4221 and 4321 may be conducting materials such as copper, ITO, MoAlMo, silver, graphene and graphite. The electrode material may be grown on a substrate by use of a yellow light process, or may be bounded by two layers of sensor modules in a GFF manner or printed on the substrate. The substrate may be a material such as glass or a film.

Shapes of the first sensor electrode and the second sensor electrode are not limited. FIG. 3 is a schematic diagram illustrating an electrode shape. Rx1-6 are first sensor electrodes, and Tx1 and Tx2 are second sensor electrodes.

Data generated by touch of the finger over the touchpad may be detected in a capacitive detection working manner through the sensor module formed by the first basic electrode group 421, the second basic electrode group 422, the first collecting electrode group 431 and the second collecting electrode group 432. A touch control chip in the control circuit 401 reads the data, calculates coordinate data of the finger and sends the coordinate data to a system. Meanwhile, fingerprint information of the fingerprint may also be read and sent to the system.

Figure 5:
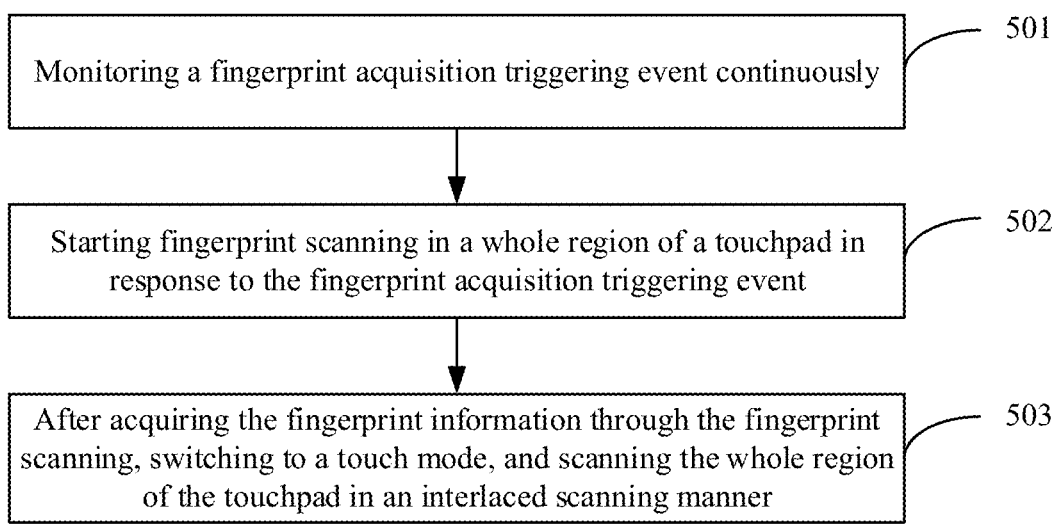
FIG. 5 is a flowchart showing a method for fingerprint acquisition, according to some embodiments of the disclosure.

Some embodiments of the present disclosure also provide a method for fingerprint acquisition, which may be combined with a touchpad provided in the present disclosure. The whole touchpad is configured to be capable of flexibly switching two working modes of touch coordinate information acquisition and fingerprint information acquisition, and two functions are realized through the same set of sensor module. As shown in FIG. 5, a specific flow includes the following blocks.

In Block 501, monitoring a fingerprint acquisition triggering event continuously.

In the block, a system continuously monitors the fingerprint acquisition triggering event that may be an event generated by an external operation of a user and may also be an internal state event of the system. The fingerprint acquisition triggering event may be preset in the system and may also be updated in a subsequent using process.

In Block 502, starting fingerprint scanning in a whole region of a touchpad in response to the fingerprint acquisition triggering event.

In the embodiment, the touchpad shown in FIG. 1 is adopted, and fingerprint acquisition may be performed at any position of the whole touchpad.

In a normal state, the touchpad performs interlaced scanning, and acquired finger image information is relatively rough and not suitable for acquisition of fingerprint information. Therefore, when the touchpad is in a touch mode for finger coordinate scanning, no fingerprint information but only touch coordinate information data is provided for the system. In the step, after the fingerprint acquisition triggering event occurs, it is determined that fingerprint acquisition is required, namely the touchpad turns on a fingerprint acquisition mode, and the whole region of the touchpad is scanned row by row. A control circuit applies a fingerprint acquisition signal to all first sensor electrodes in the touchpad to drive all the first sensor electrodes to execute scanning to acquire the fingerprint information.

For example, after electrodes are arranged according to a first gap of 50 μm and a second gap of 50 μm, all the first sensor electrodes are started to execute scanning at an interval of 50 μm to acquire the fingerprint information.

In Block 503, after acquiring the fingerprint information through the fingerprint scanning, switching to a touch mode, and scanning the whole region of the touchpad in an interlaced scanning manner.

After the fingerprint information is acquired, a basic function of the touchpad may be recovered, and only the touch coordinate information is required to be acquired to recognize a finger movement of the user on the touchpad. Therefore, switching to the touch mode may be executed for interlaced scanning. Preferably, an interlaced scanning interval is a value ranging from 0.6 mm to 4 mm. Furthermore, the interlaced scanning interval may be set in a range of 3 mm to 3.5 mm. For example, after the electrodes are arranged at the first gap of 50 μm and the second gap of 50 μm, the sensor electrodes are selected at an interval of 60 to 70 first sensor electrodes to execute scanning. The number of the first sensor electrodes required to be driven for interlaced scanning is greatly reduced compared with that for fingerprint acquisition, so that the working efficiency is improved, and the data processing pressure of the system is reduced.

Figure 6:
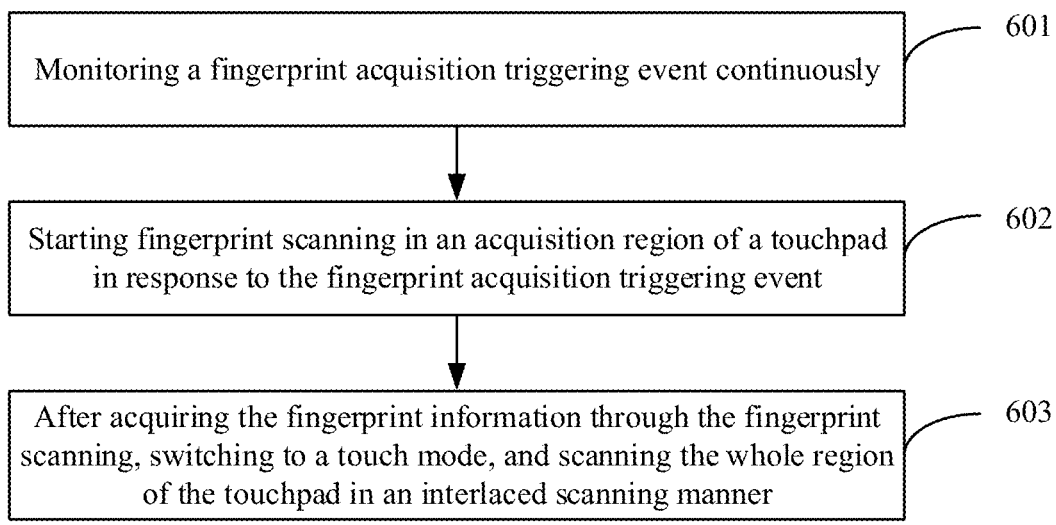
FIG. 6 is a flowchart showing a method for fingerprint acquisition, according to some embodiments of the disclosure.

Some embodiments of the present disclosure also provide a method for fingerprint acquisition, which may be combined with a touchpad provided in the present disclosure. The touchpad is regionally configured and includes a basic region and an acquisition region. The basic region only provides a touch function and acquires touch coordinate information. The acquisition region, on the basis of providing the touch function, may further acquire fingerprint information according to a requirement. The acquisition region is flexibly switched between two working modes of touch coordinate information acquisition and fingerprint information acquisition, and two functions are realized through the same set of sensor module. Based on different distributed functions, electrodes are arranged at a relatively high density in the acquisition region and while arranged at a relatively low density in the basic region. The total number of the electrodes is effectively reduced, power consumption of signal lines and input/output (I/O) interfaces is reduced on the premise of ensuring the functions, and system efficiency is further improved. As shown in FIG. 6, a specific flow includes the following blocks.

In Block 601, monitoring a fingerprint acquisition triggering event continuously.

In the block, a system continuously monitors the fingerprint acquisition triggering event that may be an event generated by an external operation of a user and may also be an internal state event of the system. The fingerprint acquisition triggering event may be preset in the system and may also be updated in a subsequent using process.

In Block 602, starting fingerprint scanning in an acquisition region of a touchpad in response to the fingerprint acquisition triggering event.

In the embodiment, the touchpad shown in FIG. 4 is adopted. The touchpad includes the basic region and the acquisition region. Fingerprint acquisition may be performed in the acquisition region. The basic region and the acquisition region belong to the same set of sensor module and are controlled and managed by a control circuit in a unified manner.

In a normal state, interlaced scanning is performed in the acquisition region and the basic region, and acquired finger image information is relatively rough and not suitable for acquisition of the fingerprint information. Therefore, when the touchpad is in a touch mode for finger coordinate scanning, no fingerprint information but only touch coordinate information data is provided for the system.

In the block, after the fingerprint acquisition triggering event occurs, it is determined that fingerprint acquisition is required, namely the acquisition region turns on a fingerprint acquisition mode, and the fingerprint acquisition region in the touchpad is scanned row by row. The control circuit applies a fingerprint acquisition signal to all first sensor electrodes in the acquisition region to drive all the first sensor electrodes to execute scanning to acquire the fingerprint information.

For example, after the electrodes are arranged according to a first acquisition gap of 50 μm and a second acquisition gap of 50 μm, all the first sensor electrodes in the acquisition region are started to execute scanning at an interval of 50 μm to acquire the fingerprint information.

Meanwhile, the basic region still works in the touch mode to acquire the touch coordinate information. A density of first sensor electrodes arranged in the basic region may be relatively low, and a first basic gap and second basic gap of the basic region may be set in a range of 0.6 mm to 4 mm. The first basic gap and the second basic gap may be the same, for example, 3.5 mm. When the first basic gap and the second basic gap are in an interval of, for example, 3 mm to 3.5 mm, the touch coordinate information may be acquired in a row-by-row scanning manner; and if the first basic gap and the second basic gap are relatively small, for example, 0.6 mm, interlaced scanning may be performed, for example, the first sensor electrodes are selected at an interval of 5 first sensor electrodes to be driven for scanning.

Preferably, a row-by-row scanning region may further be reduced according to an accurate position contacting with the finger, so that the scanning workload is further reduced, the system consumption is reduced, and the fingerprint recognition efficiency is improved.

For example, a whole region of the touchpad is scanned in the interlaced scanning manner to determine a touch position at first, and then a first positioning scanning region corresponding to the touch position is determined. The first positioning scanning region covers a contact region of the finger and the touchpad to ensure that the fingerprint information is completely acquired. The first positioning scanning region is usually rectangular, and its area is usually smaller than an area of a front surface of the touchpad. After the first positioning scanning region is determined, the first positioning scanning region may be scanned row by row to acquire the fingerprint information.

The fingerprint acquisition region may also be scanned in the interlaced scanning manner to determine the touch position at first, and then a second positioning scanning region corresponding to the touch position is determined. The second positioning scanning region covers the contact region of the finger and the touchpad to ensure that the fingerprint information is completely acquired. The second positioning scanning region is usually rectangular, and its area is usually smaller than an area of the fingerprint acquisition region. After the second positioning scanning region is determined, the second positioning scanning region is scanned row by row to acquire the fingerprint information.

In Block 603, after acquiring the fingerprint information through the fingerprint scanning, switching to a touch mode, and scanning the whole region of the touchpad in an interlaced scanning manner.

After the fingerprint information is acquired, a basic function of the acquisition region may be recovered, and only the touch coordinate information is required to be acquired to recognize a finger movement of the user on the touchpad. The acquisition region and the basic region form a region operable for the user on the front surface of the touchpad. Performing full-region recognition on pressing and sliding operations and the like of the finger of the user prevents division of functional regions and brings convenience to the user. After switching to the touch mode, interlaced scanning is performed. Preferably, an interlaced scanning interval is a value ranging from 0.6 mm to 4 mm. Furthermore, the interlaced scanning interval may be set in a range of 3 mm to 3.5 mm. For example, after the electrodes are arranged at the first acquisition gap of 50 μm and the second acquisition gap of 50 μm, the sensor electrodes in the acquisition region are selected at an interval of 60 to 70 first sensor electrodes to execute scanning. The number of the first sensor electrodes required to be driven for interlaced scanning is greatly reduced compared with that for fingerprint acquisition, so that the working efficiency is improved, and the data processing pressure of the system is reduced.

The basic region still works in the touch mode to acquire the touch coordinate information.

Some embodiments of the present disclosure also provide a method for fingerprint acquisition. A user operation is monitored to discover a fingerprint acquisition triggering event, the fingerprint acquisition triggering event at least including that a fingerprint acquisition gesture occurs on a touchpad.

The fingerprint acquisition gesture made to the touchpad may be a specific gesture indicated by information input by a continuous operation of a user in an operating range of the touchpad, and the specific gesture may be preset in a system and may also be independently set by the user according to a using habit.

For example, when a specific gesture in form of characters "W," "Q," "P," "O," "Z," "L," "M," "N," "J," "q," "l," "m," "n," "b," "a," "8," "7," "6," "3," "2" and "1" is recognized on the touchpad, it is determined that the fingerprint acquisition triggering event occurs. Those skilled in the art should know that gestures that may practically be recognized on the touchpad are not limited to the examples listed above.

That the fingerprint acquisition gesture occurs on the touchpad may also be that multi-region touch occurs on the touchpad, namely multiple regions in the operating range of the touchpad are simultaneously pressed by fingers, the multiple regions being preferably not intersected.

For example, when the number of pressed regions on a surface of the touchpad is 2/3/4/5 (namely the number of fingers pressing the touchpad is 2/3/4/5), it is determined that the fingerprint acquisition triggering event occurs.

Preferably, a definition content of the fingerprint acquisition triggering event may further be enriched. For example, the fingerprint acquisition gesture occurs on the touchpad when the system is in a screen-locked state, and the application scenario that "the system is in the screen-locked state" is combined.

Figure 7:
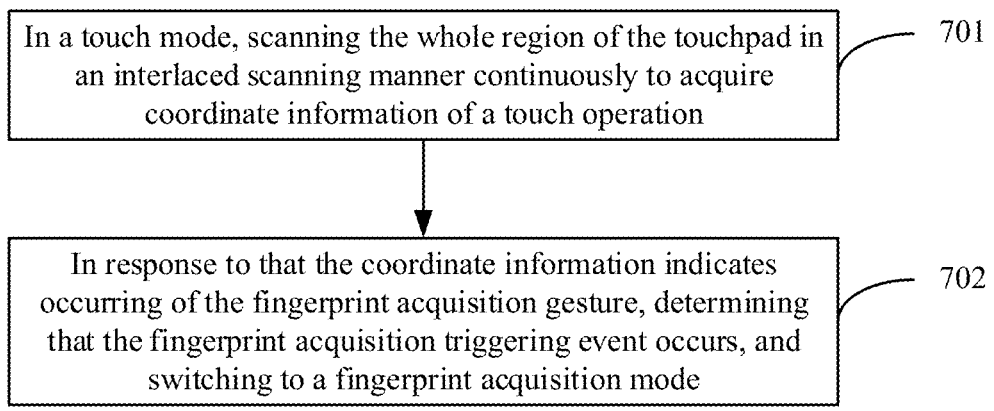
FIG. 7 is a flowchart showing continuously monitoring a fingerprint acquisition triggering event, according to some embodiments of the disclosure.

As shown in FIG. 7, a flow of continuously monitoring the fingerprint acquisition triggering event includes the following blocks.

In Block 701, in a touch mode, scanning the whole region of the touchpad in an interlaced scanning manner continuously to acquire coordinate information of a touch operation.

In Block 702, in response to that the coordinate information indicates occurring of the fingerprint acquisition gesture, determining that the fingerprint acquisition triggering event occurs, and switching to a fingerprint acquisition mode.

Some embodiments of the present disclosure also provide a method for fingerprint acquisition. A system state is monitored to discover a fingerprint acquisition triggering event, the fingerprint acquisition triggering event at least including that a triggering operation is executed when a system is in a screen-locked state.

The "triggering operation" in that "the triggering operation is executed when the system is in the screen-locked state" refers to an operation executed by a user through an input device capable of interacting with the system. For example, touch is performed through a touchpad of a laptop, and key input is performed through a keyboard of the laptop. It may also be input through a peripheral, for example, a microphone (MIC), an external keyboard and a writing pad. Considering that unlocking may usually be completed with a fingerprint fast and securely during screen unlocking, the triggering operation executed when the system is in the screen-locked state is determined as the fingerprint acquisition triggering event.

The operation that the fingerprint acquisition triggering event is continuously monitored is specifically as follows: in the screen-locked state, after the triggering operation is detected, it is determined that the fingerprint acquisition triggering event occurs, and a fingerprint acquisition mode is turned on.

Figure 8:
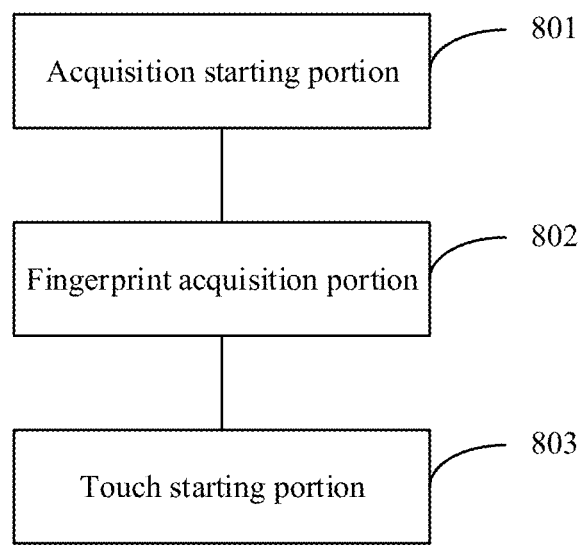
FIG. 8 is a block diagram of a device for fingerprint acquisition, according to some embodiments of the disclosure.

Some embodiments of the present disclosure also provide a device for fingerprint acquisition, which, as shown in FIG. 8, structurally includes:

an acquisition starting portion 801, configured to monitor a fingerprint acquisition triggering event continuously; and a fingerprint acquisition portion 802, configured to start fingerprint scanning in a partial or whole of a region of a touchpad in response to the fingerprint acquisition triggering event.

Figure 9:
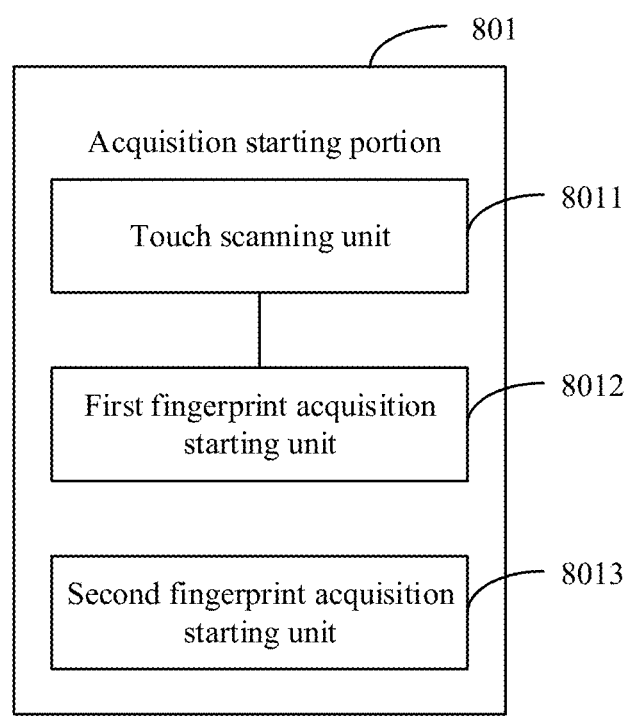
FIG. 9 is a block diagram of an acquisition starting portion, according to some embodiments of the disclosure.

Preferably, the fingerprint acquisition triggering event at least includes that a fingerprint acquisition gesture occurs on the touchpad, and as shown in FIG. 9, the acquisition starting portion 801 structurally includes:

a touch scanning unit 8011, configured to, in a touch mode, continuously scan the whole region of the touchpad in an interlaced scanning manner to acquire coordinate information of a touch operation, and a first fingerprint acquisition starting unit 8012, configured to, in response to that the coordinate information indicates occurring of the fingerprint acquisition gesture, determine that the fingerprint acquisition triggering event occurs and switch to a fingerprint acquisition mode.

Preferably, the fingerprint acquisition triggering event at least includes that a triggering operation is executed when a system is in a screen-locked state; and the acquisition starting portion 801 further includes:

a second fingerprint acquisition starting unit 8013, configured to, in the screen-locked state, after the triggering operation is detected, determine that the fingerprint acquisition triggering event occurs and turn on the fingerprint acquisition mode, the operation at least including any one or more of the following operations:

touching on the touchpad, key-press inputting and inputting through a peripheral.

Figure 10:
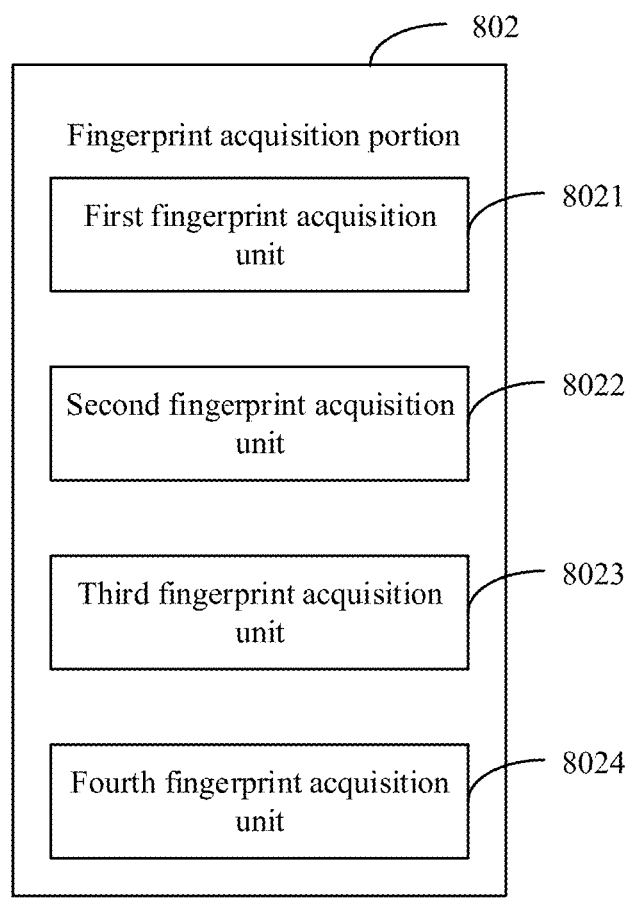
FIG. 10 is a block diagram of a fingerprint acquisition portion, according to some embodiments of the disclosure.

Preferably, as shown in FIG. 10, the fingerprint acquisition portion 802 structurally includes:

a first fingerprint acquisition unit 8021, configured to, in case that the touchpad includes a fingerprint acquisition region, scan the fingerprint acquisition region in the touchpad row by row to acquire fingerprint information, an area of the fingerprint acquisition region being smaller than an area of a front surface of the touchpad;

a second fingerprint acquisition unit 8022, configured to scan the whole region of the touchpad row by row to acquire the fingerprint information;

a third fingerprint acquisition unit 8023, configured to scan the whole region of the touchpad in the interlaced scanning manner to determine a touch position, then determine a first positioning scanning region corresponding to the touch position and scan the first positioning scanning region row by row to acquire the fingerprint information; and a fourth fingerprint acquisition unit 8024, configured to scan the fingerprint acquisition region in the interlaced scanning manner to determine the touch position, then determine a second positioning scanning region corresponding to the touch position and scan the second positioning scanning region row by row to acquire the fingerprint information.

Preferably, the device further includes:

a touch starting portion 803, configured to, after acquiring the fingerprint information through the fingerprint scanning, switch to the touch mode and scan the whole region of the touchpad in the interlaced scanning manner.

Some embodiments of the present disclosure also provide a computer device, which includes:

a processor; and a memory configured to store instructions executable by the processor, wherein the processor is configured to:

monitor a fingerprint acquisition triggering event continuously; and start fingerprint scanning in a partial or whole of a region of a touchpad in response to the fingerprint acquisition triggering event.

Figure 11:
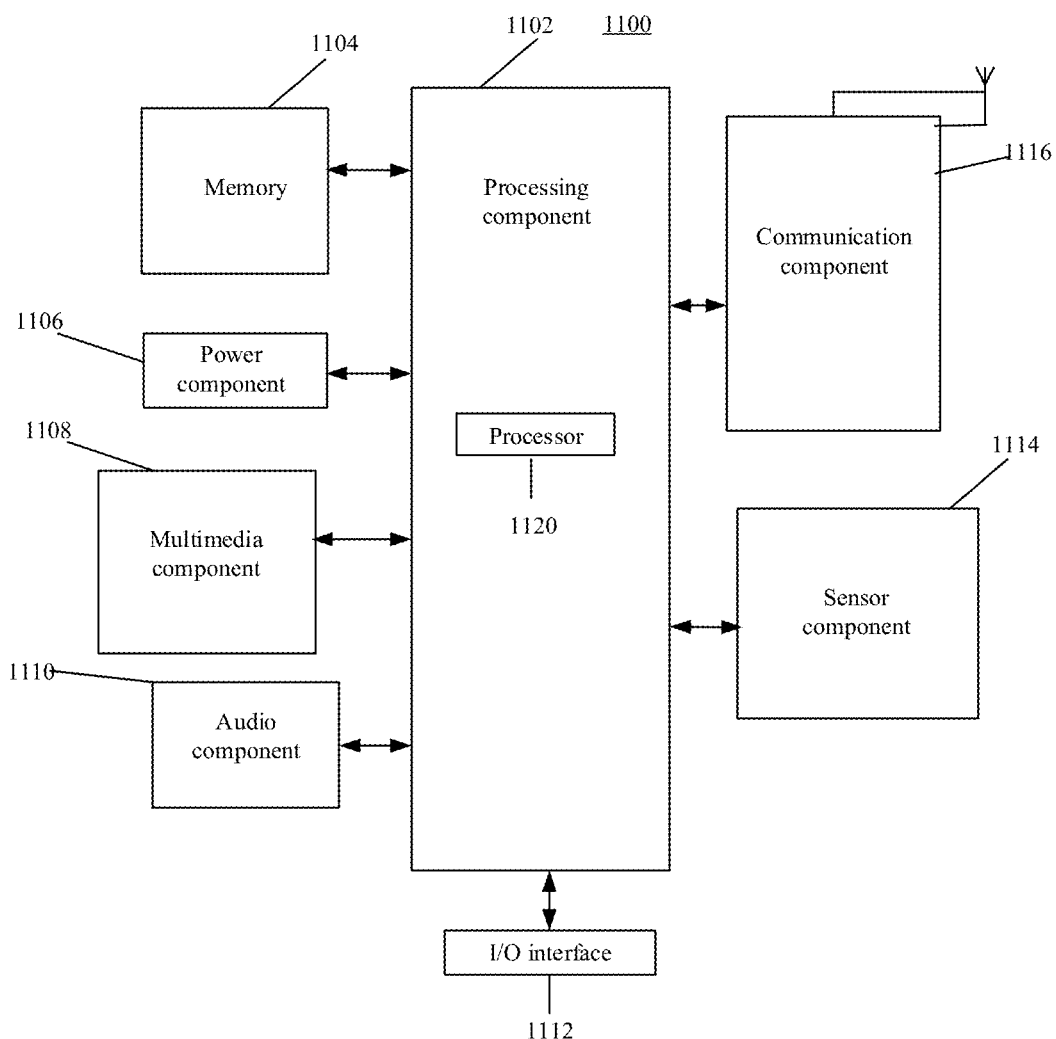
FIG. 11 is a block diagram of a device (a general structure of a mobile terminal), according to some embodiments of the disclosure.

FIG. 11 is a block diagram of a device 1100 for fingerprint acquisition, according to some embodiments of the disclosure. For example, the device 1100 may be a mobile phone, a computer, a digital broadcast terminal, a messaging device, a gaming console, a tablet, a medical device, exercise equipment, a personal digital assistant and the like.

Referring to FIG. 11, the device 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 typically controls overall operations of the device 1100, such as the operations associated with display, telephone calls, data communications, camera operations, and recording operations. The processing component 1102 may include one or more processors 1120 to execute instructions to perform all or part of the blocks in the abovementioned method. Moreover, the processing component 1102 may include one or more modules which facilitate interaction between the processing component 1102 and the other components. For instance, the processing component 1102 may include a multimedia module to facilitate interaction between the multimedia component 1108 and the processing component 1102.

The memory 1104 is configured to store various types of data to support the operation of the device 1100. Examples of such data include instructions for any applications or methods operated on the device 1100, contact data, phonebook data, messages, pictures, video, etc. The memory 1104 may be implemented by any type of volatile or non-volatile memory devices, or a combination thereof, such as an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 1106 provides power for various components of the device 1100. The power component 1106 may include a power management system, one or more power supplies, and other components associated with generation, management and distribution of power for the device 1100.

The multimedia component 1108 includes a screen providing an output interface between the device 1100 and a user. In some embodiments, the screen may include a liquid crystal display (LCD) and a touch panel (TP). In some embodiments, organic light-emitting diode (OLED) or other types of displays can be employed. If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1108 includes a front camera and/or a rear camera. The front camera and/or the rear camera may receive external multimedia data when the device 1100 is in an operation mode, such as a photographing mode or a video mode. Each of the front camera and the rear camera may be a fixed optical lens system or have focusing and optical zooming capabilities.

The audio component 1110 is configured to output and/or input an audio signal. For example, the audio component 1110 includes a MIC, and the MIC is configured to receive an external audio signal when the device 1100 is in the operation mode, such as a call mode, a recording mode and a voice recognition mode. The received audio signal may further be stored in the memory 1104 or sent through the communication component 1116. In some embodiments, the audio component 1110 further includes a speaker configured to output the audio signal.

The I/O interface 1112 provides an interface between the processing component 1102 and a peripheral interface module, and the peripheral interface module may be a keyboard, a click wheel, a button and the like. The button may include, but not limited to: a home button, a volume button, a starting button and a locking button.

The sensor component 1114 includes one or more sensors configured to provide status assessment in various aspects for the device 1100. For instance, the sensor component 1114 may detect an on/off status of the device 1100 and relative positioning of components, such as a display and small keyboard of the device 1100, and the sensor component 1114 may further detect a change in a position of the device 1100 or a component of the device 1100, presence or absence of contact between the user and the device 1100, orientation or acceleration/deceleration of the device 1100 and a change in temperature of the device 1100. The sensor component 1114 may include a proximity sensor configured to detect presence of an object nearby without any physical contact. The sensor component 1114 may also include a light sensor, such as a complementary metal oxide semiconductor (CMOS) or charge coupled device (CCD) image sensor, configured for use in an imaging application. In some embodiments, the sensor component 1114 may also include an acceleration sensor, a gyroscope sensor, a magnetic sensor, a pressure sensor or a temperature sensor.

The communication component 1116 is configured to facilitate wired or wireless communication between the device 1100 and another device. The device 1100 may access a communication-standard-based wireless network, such as a wireless fidelity (Wi-Fi) network, a 2nd-generation (2G), 3rd-generation (3G), $4^{th}$-generation (4G), or $5^{th}$-generation (5G) network or a combination thereof. In some embodiments of the disclosure, the communication component 1116 receives a broadcast signal or broadcast associated information from an external broadcast management system through a broadcast channel. In some embodiments of the disclosure, the communication component 1116 further includes a near field communication (NFC) module to facilitate short-range communication. For example, the NFC module may be implemented based on a radio frequency identification (RFID) technology, an infrared data association (IrDA) technology, an ultra-wide band (UWB) technology, a Bluetooth (BT) technology and another technology.

In some embodiments of the disclosure, the device 1100 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to execute the abovementioned method.

In some embodiments of the disclosure, there is also provided a non-transitory computer-readable storage medium including instructions, such as the memory 1104 including instructions, and the instructions may be executed by the processor 1120 of the device 1100 to implement the abovementioned method. For example, the non-transitory computer-readable storage medium may be a ROM, a compact disc read-only memory (CD-ROM), a magnetic tape, a floppy disc, an optical data storage device and the like.

According to a non-transitory computer-readable storage medium, instructions in the storage medium are executed by a processor of a mobile terminal to enable the mobile terminal to execute a method for fingerprint acquisition, the method including that:

monitoring a fingerprint acquisition triggering event continuously; and starting fingerprint scanning in a partial or whole of a region of a touchpad in response to the fingerprint acquisition triggering event.

The present disclosure provides a method and device for the fingerprint acquisition, and a touchpad. When the electrodes are arranged in the touchpad, the first sensor electrodes are arranged at a relatively high density in the whole touchpad or the acquisition region according to a requirement of a fingerprint acquisition function, and part or all of the first sensor electrodes are controlled through the control circuit to acquire the coordinate information or acquire the fingerprint information, so that two functions are realized in the same sensor module. The fingerprint acquisition triggering event is continuously monitored, and after the fingerprint acquisition triggering event occurs, fingerprint scanning in a partial or whole of the region of the touchpad is started. The two functions of acquiring the coordinate information and acquiring the fingerprint information are switched, so that a user requirement is met, meanwhile, implementation cost is reduced, and system resources are saved.

Adopting the sensor electrode of the touchpad as fingerprint acquisition equipment may greatly improve the fingerprint recognition accuracy, reduce the thickness of the touchpad, ensure that an overall design of the product is lighter and thinner and reduce the cost. The fingerprint acquisition region is not limited to conventional fingerprint sensor acquisition, so that the fingerprint acquisition area is expanded, even multiple pieces of fingerprint information may be acquired at the same time, and the overall security of the system is improved.

Under the condition of not reducing an operation area of the touchpad, for further reducing the cost, the acquisition region may be divided as a region for fingerprint acquisition. Therefore, integrity of the region for a touch operation of the user is ensured, better and smoother user experiences are ensured, and meanwhile, the fingerprint acquisition function is realized. A touchpad sensor module and a fingerprint sensor module are practically the same set of sensor module, and different modes are switched at different time to realize different functions, so that the production cost is reduced.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A touchpad, comprising a control circuit, a first electrode group, and a second electrode group, wherein
the first electrode group comprises a first basic electrode group and a first collecting electrode group, and the second electrode group comprises a second basic electrode group and a second collecting electrode group;
the first basic electrode group comprises multiple first basic sensor electrodes arranged in parallel in a first direction, each of the first basic sensor electrodes is spaced from an adjacent first basic sensor electrode with a first basic gap, and each of the first basic sensor electrodes is electrically connected with the control circuit through at least one of first signal lines;
the second basic electrode group comprises multiple second basic sensor electrodes arranged in parallel in a second direction, each of the second basic sensor electrodes is spaced from an adjacent second basic sensor electrode with a second basic gap, and the first direction is not parallel to the second direction;
the first collecting electrode group comprises multiple first collecting sensor electrodes arranged in parallel in the first direction, each of the first collecting sensor electrodes is spaced from an adjacent first collecting sensor electrode with a first acquisition gap, and each of the first collecting sensor electrodes is electrically connected with the control circuit through the at least one of the first signal lines;
the second collecting electrode group comprises multiple second collecting sensor electrodes arranged in parallel in the second direction, and each of the second collecting sensor electrodes is spaced from an adjacent second collecting sensor electrode with a second acquisition gap;
the first basic gap is larger than the first acquisition gap, and the second basic gap is larger than the second acquisition gap;

the first acquisition gap is less than or equal to 50 μm, and the second acquisition gap is less than or equal to 50 μm;

in a case that the first electrode group and the second electrode group are stacked, an overlapping portion of the first collecting electrode group and the second collecting electrode group forms an acquisition region, and a region of the touchpad except the acquisition region is a basic region; and the control circuit is configured to apply a touch scanning signal to part or all of the first basic sensor electrodes in the first basic electrode group through the at least one of the first signal lines, apply the touch scanning signal to part of the first collecting sensor electrodes in the first collecting electrode group through the at least one of the first signal lines, and apply a fingerprint acquisition signal to all of the first collecting sensor electrode in the first collecting electrode group through the at least one of first signal lines.

2. The touchpad of claim 1, wherein
the first electrode group is integrated on a first circuit board, the second electrode group is integrated on a second circuit board, and the first circuit board and the second circuit board are stacked in a complete overlapping manner.

3. The touchpad of claim 1, wherein
the first basic gap is equal to the second basic gap, and the first acquisition gap is equal to the second acquisition gap.

4. A mobile terminal comprising the touchpad of claim 1, wherein
the first sensor electrodes are arranged at a density suitable for fingerprint acquisition function;
at least some of the first sensor electrodes are controlled through the control circuit to acquire coordinate information or acquire fingerprint information, thereby realizing both coordinate acquisition function and fingerprint acquisition function in a same sensor module; and
the touchpad is configured to:
monitor fingerprint acquisition triggering events continuously monitored, and upon the fingerprint acquisition triggering event occurs, start fingerprint scanning in a part or whole of the touchpad; and
switch between the coordinate acquisition function and the fingerprint acquisition function.

5. A method for fingerprint acquisition with the touchpad of claim 1, the method comprising:
monitoring a fingerprint acquisition triggering event continuously; and
starting fingerprint scanning in a partial or whole of a region of the touchpad in response to the fingerprint acquisition triggering event.

6. The method of claim 5, wherein the fingerprint acquisition triggering event comprises that a fingerprint acquisition gesture occurs on the touchpad; and
the monitoring the fingerprint acquisition triggering event continuously comprises:
in a touch mode, scanning the whole region of the touchpad in an interlaced scanning manner continuously to acquire coordinate information of a touch operation, and
in response to that the coordinate information indicates occurring of the fingerprint acquisition gesture, determining that the fingerprint acquisition triggering event occurs, and switching to a fingerprint acquisition mode.

7. The method of claim 5, wherein the fingerprint acquisition triggering event comprises a triggering operation in a screen-locked state of a system; and
the monitoring the fingerprint acquisition triggering event continuously comprises:
in the screen-locked state, after the triggering operation is detected, determining that the fingerprint acquisition triggering event occurs, and turning on the fingerprint acquisition mode, the triggering operation comprising at least one or more of the following operations:
touching on the touchpad, key-press inputting or inputting through a peripheral.

8. The method of claim 5, wherein the touchpad comprises a fingerprint acquisition region, an area of the fingerprint acquisition region is smaller than an area of a front surface of the touchpad, and the starting the fingerprint scanning in the partial or whole of the region of the touchpad in response to the fingerprint acquisition triggering event comprises:
scanning the fingerprint acquisition region in the touchpad row by row to acquire fingerprint information.

9. The method of claim 8, after the starting fingerprint scanning in the partial or whole of the region of the touchpad in response to the fingerprint acquisition triggering event, further comprising:
after acquiring the fingerprint information through the fingerprint scanning, switching to a touch mode, and scanning the whole region of the touchpad in an interlaced scanning manner.

10. The method of claim 5, wherein the touchpad comprises a fingerprint acquisition region, an area of the fingerprint acquisition region is equal to an area of a front surface of the touchpad, and the starting the fingerprint scanning in the partial or whole of the region of the touchpad in response to the fingerprint acquisition triggering event comprises:
scanning the whole region of the touchpad row by row to acquire fingerprint information.

11. The method of claim 5, wherein the starting the fingerprint scanning in the partial or whole of the region of the touchpad in response to the fingerprint acquisition triggering event comprises:
scanning the whole region of the touchpad in an interlaced scanning manner to determine a touch position; and
determining a first positioning scanning region corresponding to the touch position, and scanning the first positioning scanning region row by row to acquire fingerprint information.

12. The method of claim 5, wherein the starting the fingerprint scanning in the partial or whole of the region of the touchpad in response to the fingerprint acquisition triggering event comprises:
scanning a fingerprint acquisition region of the touchpad in an interlaced scanning manner to determine a touch position; and
determining a second positioning scanning region corresponding to the touch position, and scanning the second positioning scanning region row by row to acquire fingerprint information.

13. A device for fingerprint acquisition implementing the method of claim 5, the device comprising:
a processor; and
a memory device storing instructions for execution by the processor to implement steps of the method.

14. The device of claim 13, wherein
the fingerprint acquisition triggering event comprises at least one of a fingerprint acquisition gesture occurring on the touchpad or multi-region touch occurring on the touchpad; and
the processor is further configured to:
in a touch mode, scan the whole region of the touchpad in an interlaced scanning manner continuously to acquire coordinate information of a touch operation, and
in response to that the coordinate information indicates occurring of the fingerprint acquisition gesture, determine that the fingerprint acquisition triggering event occurs and switch to a fingerprint acquisition mode.

15. The device of claim 13, wherein the fingerprint acquisition triggering event comprises a triggering operation in a screen-locked state of a system; and
the processor is further configured to:
in the screen-locked state, after the triggering operation is detected, determine that the fingerprint acquisition triggering event occurs and turn on the fingerprint acquisition mode, the triggering operation comprises at least one of:
touching on the touchpad, key-press inputting or inputting through a peripheral.

16. The device of claim 13, wherein the processor is further configured to perform at least one of:
in a case that the touchpad comprises a fingerprint acquisition region, scanning the fingerprint acquisition region in the touchpad row by row to acquire fingerprint information, wherein an area of the fingerprint acquisition region is smaller than an area of a front surface of the touchpad;
scanning the whole region of the touchpad row by row to acquire the fingerprint information;
scanning the whole region of the touchpad in an interlaced scanning manner to determine a touch position, and determining a first positioning scanning region corresponding to the touch position and scanning the first positioning scanning region row by row to acquire the fingerprint information; or
scanning the fingerprint acquisition region in the interlaced scanning manner to determine the touch position, and determining a second positioning scanning region corresponding to the touch position and scanning the second positioning scanning region row by row to acquire the fingerprint information.

17. The touchpad of claim 1, wherein
an area of the acquisition region is smaller than an area of the basic region.

18. The touchpad of claim 1, wherein
the first direction is perpendicular to the second direction.

* * * * *